Jan. 8, 1952 P. B. REEVES 2,582,067
SPEED-VARYING POWER TRANSMISSION ASSEMBLY
Filed Dec. 31, 1949 3 Sheets-Sheet 1
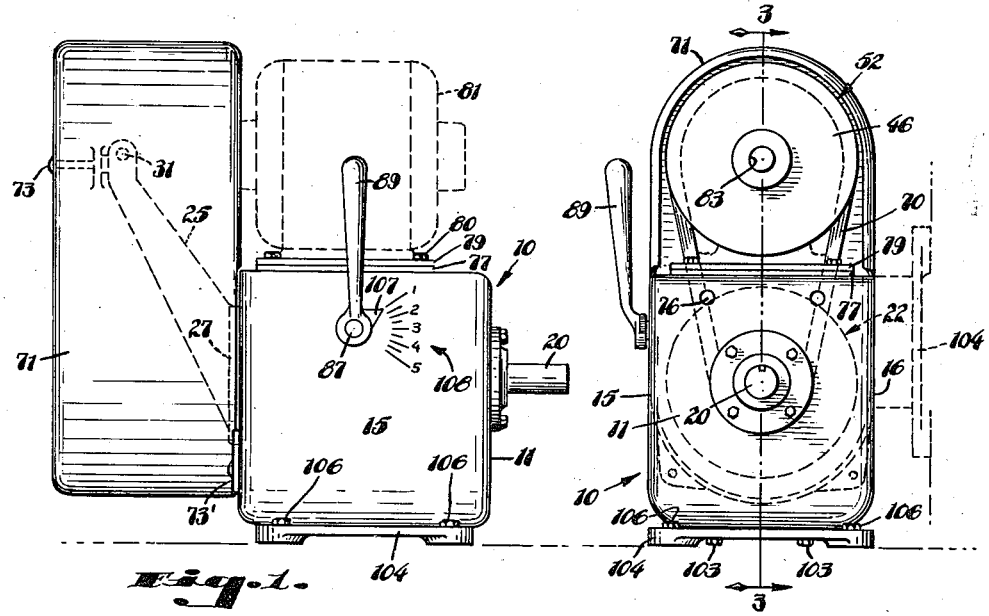
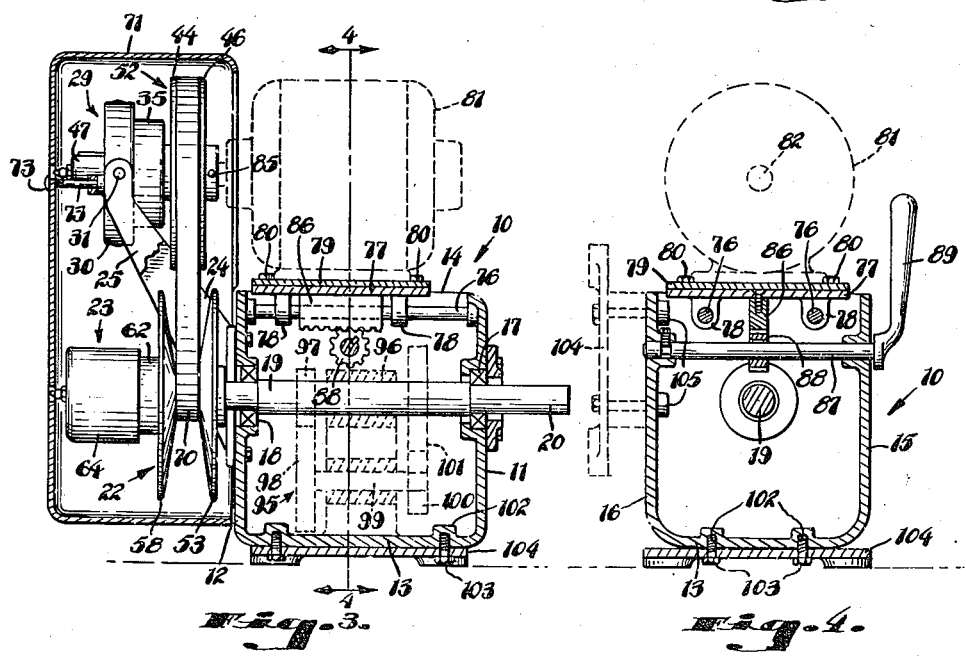
INVENTOR.
PAUL B. REEVES,
BY:
Harold B. Hood.
ATTORNEY.

Jan. 8, 1952        P. B. REEVES        2,582,067
SPEED-VARYING POWER TRANSMISSION ASSEMBLY
Filed Dec. 31, 1949        3 Sheets-Sheet 2
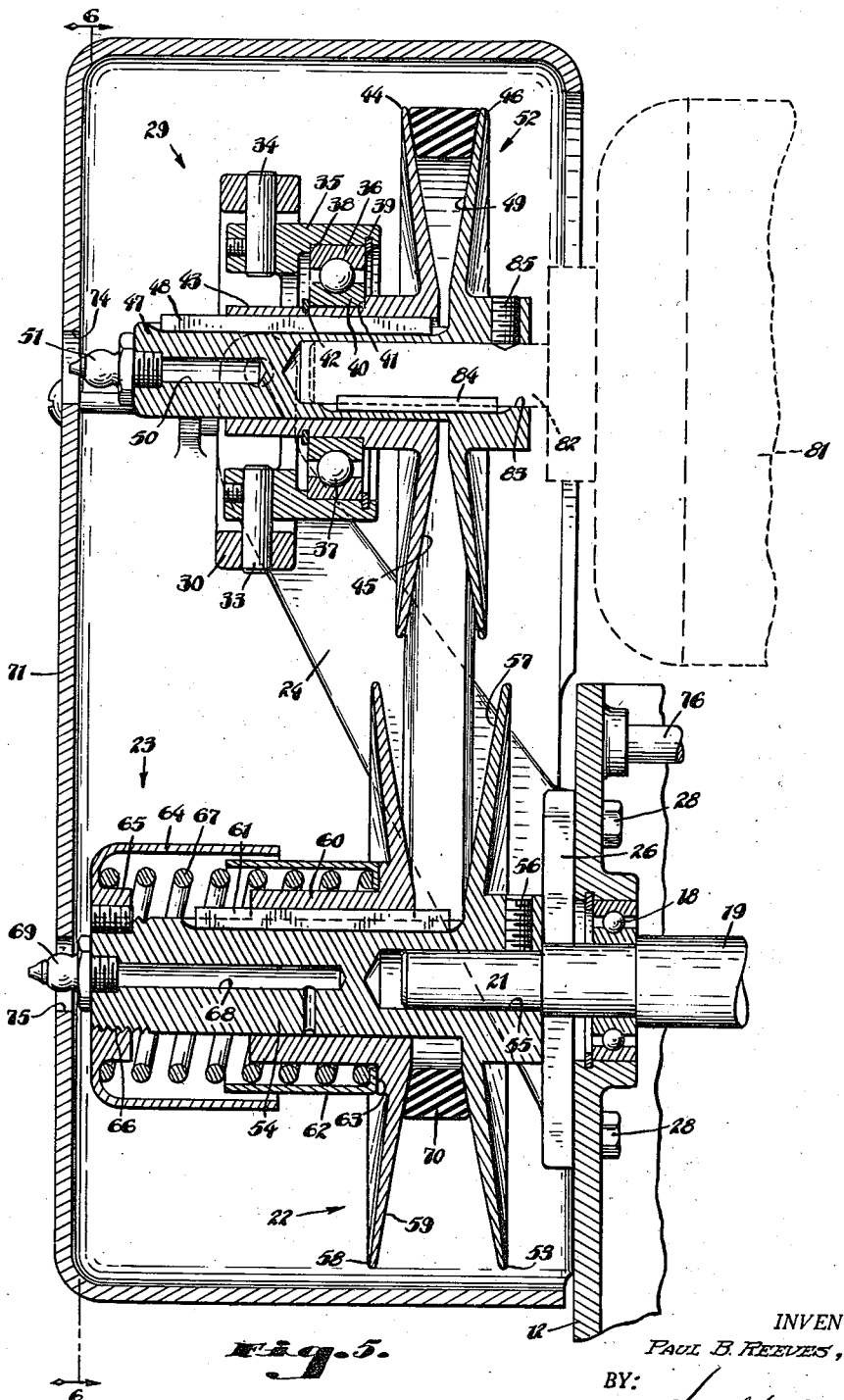
INVENTOR.
PAUL B. REEVES,
BY:
ATTORNEY.

Jan. 8, 1952 P. B. REEVES 2,582,067
SPEED-VARYING POWER TRANSMISSION ASSEMBLY
Filed Dec. 31, 1949 3 Sheets-Sheet 3

INVENTOR.
PAUL B. REEVES,
BY: Harold B. Hood.
ATTORNEY.

Patented Jan. 8, 1952

2,582,067

UNITED STATES PATENT OFFICE 2,582,067

SPEED-VARYING POWER TRANSMISSION ASSEMBLY

Paul B. Reeves, Columbus, Ind., assignor to Reeves Pulley Company, Columbus, Ind., a corporation of Indiana Application December 31, 1949, Serial No. 136,201

9 Claims. (Cl. 74—230.17)

1

The present invention relates to a speed-varying power transmission assembly and more particularly to a self-contained unit, adapted to be sold for installation between a customer's motor, or other power-delivering shaft, and the customer's machine to provide for incremental variation of the speed at which power is delivered from such motor or other shaft to the machine. More particularly, it is a primary object of the present invention to provide a novel unit which, as a unitary assembly, may be installed between substantially any source of rotary power and a machine to be driven, and which, when so installed, will be complete in itself to provide desired speed variation between the power source and the machine to be driven.

A further object of the invention is to provide suspension means for a variable-effective-diameter pulley, in association with a resiliently-variable pulley, of such character that, when a driving shaft is associated with said first-named pulley, axial adjustment of said driving shaft will vary the speed ratio of the pulley pair. A further object of the invention is to provide, in an assembly of the character above described, support means for a driving motor so associated with the other parts of the assembly as to provide for such axial adjustment of the motor to vary the speed ratio of the assembly. A further object of the invention is to provide a novel base or housing, so constructed as to be mounted selectively in either of two alternative positions upon a standard adapted to be fixed to a floor or other supporting surface. Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a side elevation of an assembly constructed in accordance with my invention, a driving motor, adapted to be associated therewith, being suggested in broken lines;

Fig. 2 is an end elevation thereof as viewed from the right of Fig. 1;

Fig. 3 is a vertical section therethrough, taken substantially on the line 3—3 of Fig. 2, certain parts being shown in elevation;

Fig. 4 is a vertical section taken substantially on the line 4—4 of Fig. 3;

Fig. 5 is a vertical section, drawn to an enlarged scale, of the speed-varying pulley pair and associated parts, taken upon the plane common to the axes of the pulleys;

Figure 6:
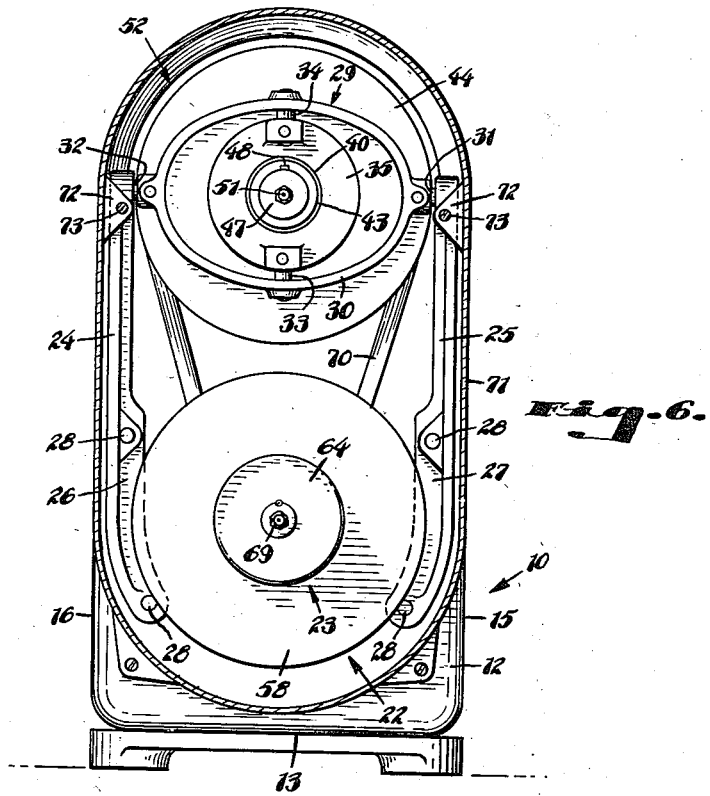
Fig. 6 is an end elevation of the unit of Fig. 1, taken from the left thereof, the cover or casing being shown in section.

Referring more particularly to the drawings, it will be seen that I have shown an assembly comprising a base or housing indicated generally by the reference numeral 10 and including a pair of opposite end walls 11 and 12, a pair of opposite side walls 13 and 14, perpendicular to the end walls, and a further pair of side walls 15 and 16, perpendicular to the end walls and to the side walls 13 and 14. The end walls 11 and 12 are formed to support, respectively, aligned bearings 17 and 18 providing journal mountings for shafting indicated by the reference numeral 19, and including a section 20 projecting outwardly beyond the wall 11, and a section 21 projecting outwardly beyond the wall 12. As will appear from the following description, the sections 20 and 21 may be integral portions of a single shaft, or they may be separate, and independently rotatable elements connected by a suitable driving train.

The section 20 is adapted to be operatively connected to drive any desired machine (not shown); while a resiliently-expansible V-pulley, indicated generally by the reference numeral 22 and having operatively associated therewith a preloaded spring unit indicated generally by the reference numeral 23, is assembled on the projecting section 21 outside the base or housing 10.

Supported upon the external surface of the wall 12, and laterally on opposite sides of the shaft axis, I provide two bracket arms 24 and 25, each having a broadened foot 26 or 27 bearing against said wall and secured thereto by screws 28 or other equivalent fastening means. Each such bracket arm inclines outwardly and away from the axis of the shafting 19 to a point axially beyond the outermost portion of the pulley 22 and radially spaced from said axis a distance substantially greater than the radius of such pulley. At that point, a gimbal ring, indicated generally by the reference numeral 29, is supported between said bracket arms.

As is most clearly illustrated in Fig. 5, the gimbal ring 29 comprises a closed yoke or ring 30 mounted for oscillation about the common axis of pins 31 and 32 (Fig. 6) respectively carried by the bracket arms 25 and 24. As shown, that common axis lies in a plane parallel with the horizontal plane including the axis of the shafting 19. The yoke 30, in turn, supports two pins 33 and 34 whose common axis perpendicularly intersects the common axis of the pins 31 and 32 in a point disposed in the vertical plane including the axis of the shafting 19. Oscillably mounted upon the pins 33 and 34 is a ring or shell 35 in which is supported the outer race 36 of a thrust bearing 37, said race being confined between a shoulder 38 and a snap ring 39 in the shell 35. The inner race 40 of said bearing 37 is, in turn, confined between a shoulder 41 and a snap ring 42 on the hub 43 of a coned disc 44, whereby said disc is supported, through said bearing and the gimbal ring, from the bracket arms 24 and 25. The coned face 45 of the disc 44 is presented generally toward the base 10.

A mating coned disc 46 is formed with a hub 47 telescopically received in the hub 43, a key 48 providing a rotary driving connection therebetween while permitting relative axial movement thereof. The coned face 49 of the disc 46 is presented generally away from the base 10 so that the two discs cooperate to form a variable-effective-diameter V-pulley, indicated generally by the reference numeral 52. Preferably, the remote end of the hub 47 will be formed to provide a lubricant passage 50 in which may be mounted a pressure fitting 51.

A coned disc 53, has an elongated hub 54 projecting from its coned face 57, said hub being provided, at its rear end, with an axial socket 55 in which is received the projecting end of the shafting section 21, said hub being fixed to said shafting section by suitable means such as a setscrew 56. The coned face 57 of the disc 53 is presented away from the base 10. A mating coned disc 58 is mounted with its coned face 59 presented toward the base 10, through the medium of its hub 60 which is telescopically sleeved on the hub 54, a key 61 establishing a rotary driving connection between said hubs while permitting relative axial movement therebetween. The two discs 53 and 58 thus cooperate to form the variable-effective-diameter V-pulley 22.

The spring unit 23 preferably comprises an inner shell 62 having an inturned flange 63 at one end thereof bearing upon an annular seat formed on the disc 58; an outer shell 64 having an open inner end telescopically associated with the open outer end of the shell 62, and a relatively heavy annular flange 65 at its outer end threadedly engaged with the threaded outer end 66 of the hub 54; and a heavy coiled spring 67 confined between the remote ends of the shells 62 and 64. It will be obvious that the spring acts upon the disc 58 and, through the shell 64, upon the disc 52, to resist relative axial separating movement of said discs.

Preferably, the outer end of the hub 54 will be formed to provide a lubricant passage 68 in which may be mounted a pressure fitting 69.

An edge-active belt 70 of generally V cross section, provides a driving connection between the pulleys 22 and 52 in a manner well understood in the art to which this invention pertains.

A cover or casing 71 will preferably be provided to house the transmission parts above described; said cover being secured to the base in any suitable fashion. In the illustrated embodiment of the invention, I have shown (Fig. 6) the cover provided with lateral inwardly-directed ears 72 through which may pass screws 73 taking into tapped sockets in the bracket arms 24 and 25; and I have further shown screws 73' passing through external flanges on the cover 71 and engaging in suitable sockets in the base wall 12. The cover will preferably be apertured at 74 and 75 to provide access to the fittings 51 and 69.

Within the base 10, adjacent the wall 14 thereof and parallel thereto and extending in the direction of length of the shafting 19, I provide guide means comprising a pair of laterally spaced rods 76. A platform 77, located substantially in the plane of, and constituting a part of, the wall 14, is provided with a plurality (four, in the illustrated embodiment) of depending perforated ears 78 slidably mounted on said rods 76, so that said platform is guided for free reciprocation, in a plane parallel to the shafting 19, toward and away from the bracket arms 24 and 25, the gimbal ring 29, and the disc 44 supported thereby. A plate 79 is adjustably mounted on said platform, through screws 80, for adjustable positioning relative to said platform, and said plate is proportioned and designed to act as a base or bed for any available electric motor or other source of rotary power, suggested in broken lines in Figs. 1, 3, 4 and 5, and indicated by the reference numeral 81. The plate 79 may be adjusted in position both longitudinally and laterally, relative to the platform 77, through the medium of suitable slots, or multiple and suitably distributed holes, through which the screws 80 pass into engagement with the platform 77; and said plate may further be adjusted in elevation relative to the platform by shimming, or the like. At any rate, the motor or the power source will be so located, by adjustment of said plate 79, as to dispose the axis of its spindle 82, or the like, substantially in horizontal and vertical planes including the point of intersection of the axes of the pins 31 and 32 and the pins 33 and 34. The adjacent end of the hub 47 of the disc 46 is socketed, as at 83, whereby said disc hub may be sleeved on said spindle and drivingly connected thereto, as by a key 84; and said hub is further provided with a set screw 85 whereby it may be fixedly secured against axial movement relative to said spindle 82.

In the embodiment of the invention illustrated in Figs. 3 and 4, a rack block 86 is suitably fixed to the lower surface of the platform 77 between the rods 76, a rock shaft 87 is journalled in the base walls 15 and 16, and a pinion 88, fixed to said rock shaft, meshes with the rack 86. An operating handle 89 is fixed to the shaft 87 outside the wall 15.

Figure 7:
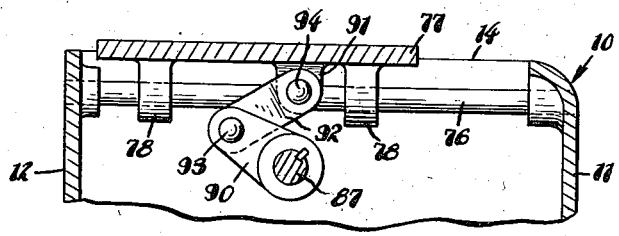
Fig. 7 is an enlarged, fragmental section, taken in the plane of Fig. 3, and showing a modified form of actuating means.

In the embodiment of Fig. 7, a lever 90 is keyed to the shaft 87 and projects substantially radially therefrom, while an ear 91 depends from the platform 77 substantially in the plane of oscillation of the lever 90. A link 92 has one end pivoted as at 93 to the free end of the lever 90, and its other end pivoted as at 94 to the ear 91, to convert oscillation of said lever 90 into reciprocation of the platform 77. In either form of actuating means, the handle 89 will preferably be provided with a pointer 107 sweeping a scale 108 suitably marked on the wall 15.

If the shafting 19 comprises independently rotatable sections 20 and 21, a speed-reducing gear, suggested in broken lines in Fig. 3 and indicated genreally by the reference numeral 95, may be housed in the base 10. In such event, the reducing gear will preferably include a frame 96 in which will be journalled the adjacent ends of the shafting sections. A pinion 97, fixed to the shafting section 21, will mesh with a gear 98 on a jack shaft 99 journalled in the frame 96, and a pinion 100 on the jack shaft will mesh with a gear 101 on the shafting section 20.

The wall 13 is provided with a plurality of tapped sockets 102 for the reception of screws 103 whereby a standard 104 may be removably secured to said wall, as shown in Figs. 1–4. The wall 16 is similarly provided with similarly spaced sockets 105, whereby the standard 104 may be alternatively secured to said wall 16, as suggested in broken lines in Figs. 2 and 4, in which case, of course, the entire assembly above described will be turned on its side, so that the pulley axes will be horizontally, rather than vertically, spaced from each other. In either case, screws or bolts 106 may be passed through suitable openings in the standard 104 to secure the standard, and so the entire assembly, to a floor or other supporting surface.

It will be clear from the above that, when the parts are assembled as shown, the belt 70 will transmit rotary motion from the pulley 52 to the pulley 22. If, now, the handle 89 is turned in a clockwise direction, as viewed in Fig. 1, the platform 77, and the motor 81 supported thereon, will be shifted to the right. The disc 46, being fixed to the motor spindle 82, will be correspondingly shifted; but the disc 44, being supported from the gimbal ring, will be held against axial movement. The pressure exerted on the belt 70 by the disc faces 45 and 49 being thus relaxed, the belt 70 may slip more deeply between said faces; and the pressure of the spring 67 on the disc 58 will cause the latter disc to move toward the disc 53, thus taking up the slack in the belt and maintaining driving pressure between the belt and both pulleys. In this fashion, the effective diameter of the pulley 52 is reduced, while that of the pulley 22 is increased, to reduce the speed at which the shafting 19 will be rotated, though the velocity of the spindle 82 remains constant.

Counter-clockwise movement of the handle 89 will, of course, move the disc 46 toward the disc 44, thus squeezing the belt outwardly between the faces 45 and 49 and pulling it more deeply between the faces 57 and 59 to move the disc 58 toward the left against the tendency of the spring 67 and increasing the velocity at which the shafting 19 will be driven.

I claim as my invention:

1. A variable-speed power transmitting unit comprising a base, a shaft journalled in said base, a resiliently-expansible V-pulley mounted on said shaft, said base including hanger means, a gimbal ring supported from said hanger means, an expansible V-pulley comprising a coned disc supported from said gimbal ring and having a hub, and a mating coned disc having a hub telescopically associated with the hub of said first-named disc, an edge-active belt providing a driving connection between said pulleys, guide means mounted on said base, slide means supported on said guide means for movement toward and away from said hanger means in a direction generally parallel with the axis of said shaft, and means projecting from said base for shifting said slide means, said base including a pair of opposite walls perpendicular to said shaft axis, a second pair of opposite walls parallel with said shaft axis, and a third pair of opposite walls parallel with said shaft axis and perpendicular to said second pair of walls, said guide means being adjacent one of said second pair of walls and parallel thereto, a standard, and means for removably attaching said standard alternatively to the other of said second pair of walls or to one of said third pair of walls.

2. A variable-speed power transmitting unit comprising a base, a shaft journalled in said base, a resiliently-expansible V-pulley mounted on said shaft, said base including hanger means, a gimbal ring supported from said hanger means, an expansible V-pulley comprising a coned disc supported from said gimbal ring and having a hub, and a mating coned disc having a hub telescopically associated with the hub of said first-named disc, an edge-active belt providing a driving connection between said pulleys, a standard, and means for removably attaching said standard alternatively to either of two adjacent, angularly related surfaces of said base parallel to said shaft.

3. A variable-speed power transmitting unit comprising a base, a shaft journalled in said base, a coned disc fixed on said shaft with its coned face presented away from said base, a mating coned disc supported from said shaft for axial reciprocation relative thereto with its coned face presented toward the coned face of said first-named disc, spring means operatively associated with said discs and continuously resisting movement of said second-named disc away from said first-named disc, hanger means supported from said base and projecting to a point axially beyond the outermost position of said second-named disc and radially spaced from the axis thereof, trunnion means supported by said hanger means at such point, an element supported on said trunnion means for oscillation about an axis perpendicular to a plane including the axis of said shaft, a member supported from said element for oscillation about an axis perpendicular to said trunnion axis, a thrust bearing fixedly carried by said member, a third coned disc axially-fixedly supported from said bearing with its coned face presented toward said base, a fourth coned disc having a hub coaxially telescopically associated with said third coned disc for axial movement relative thereto with its coned face presented toward the coned face of said third disc, and an edge-active belt providing a driving connection between the first and second discs and the third and fourth discs.

4. The unit of claim 3 including guide means supported on said frame, slide means mounted on said guide means for reciprocation longitudinally of said shaft, said slide means being adapted to support a rotor parallel with said shaft to move with said slide means, means journalled on said base and operable to reciprocate said slide means, and means for fixing said fourth disc to said rotor to move therewith.

5. The unit of claim 4 in which said slide means is provided with a rack, said last-named means comprising a rock shaft arranged upon an axis transverse to the axis of said shaft, a pinion fixed to said rock shaft and meshing with said rack, and handle means fixed to said rock shaft and located outside said base.

6. The unit of claim 4 in which said last-named means comprises a rock shaft arranged upon an axis transverse to the axis of said shaft, an arm fixed to said rock shaft and projecting substantially radially therefrom, a link having one end pivotally connected to said arm and one end pivotally connected to said slide means, and handle means fixed to said rock shaft and located outside said base.

7. A variable-speed power transmitting unit comprising a pair of end walls and four side walls defining a chamber, shafting journaled in said end walls and having sections projecting oppositely outside said chamber, guide means arranged adjacent one of said side walls in substantial parallelism with said shafting, slide means mounted on said guide means for reciprocation therealong and including a platform forming a part of said one wall, a resiliently-expansible V-pulley mounted on the portion of said shafting projecting beyond one end wall, a pair of bracket arms supported on said one wall and projecting outwardly therefrom beyond said pulley and beyond the plane of said platform, a thrust bearing, means supporting said bearing from said bracket arms, an expansible V-pulley comprising a coned disc supported from said bearing and a mating coned disc having a hub coaxially telescopically associated with said first-named disc, means for shifting said slide means along said guide means, and an edge-active belt providing a driving connection between said pulleys.

8. The unit of claim 7 including a standard and means for alternatively securing said standard to a side wall opposite said platform or to a side wall adjacent said platform.

9. The unit of claim 7 including a reducing gear housed in said chamber, said oppositely-projecting sections of said shafting being independently rotatable, and said gear providing a driving connection therebetween.

PAUL B. REEVES.

REFERENCES CITED

The following references are of record in the file of this patent:

UNITED STATES PATENTS

| Number    | Name   | Date          |
|-----------|--------|---------------|
| 2,065,197 | Reeves | Dec. 22, 1936 |
| 2,089,711 | Reeves | Aug. 10, 1937 |
| 2,140,942 | Reeves | Dec. 20, 1938 |
| 2,183,267 | Rieser | Dec. 12, 1939 |